United States Patent [19]

Evans et al.

[11] Patent Number: 5,976,999

[45] Date of Patent: Nov. 2, 1999

[54] UNLEADED TRANSPARENT VITREOUS CERAMIC COMPOSITIONS

[75] Inventors: Philip Anthony Evans; Paul Harrison, both of Leeds; Rolf Alfred Wirtz, Gerrards Cross, all of United Kingdom

[73] Assignee: Proceram, Buckinghamshire, United Kingdom

[21] Appl. No.: 08/783,955

[22] Filed: Jan. 16, 1997

Related U.S. Application Data

[63] Continuation of application No. 08/357,529, Dec. 16, 1994, abandoned, which is a continuation of application No. 08/083,354, Jun. 28, 1993, abandoned.

[30] Foreign Application Priority Data

| Jul. 1, 1992 | [GB] | United Kingdom | 9213959 |
| Feb. 13, 1993 | [GB] | United Kingdom | 9302926 |
| Mar. 12, 1993 | [GB] | United Kingdom | 9305063 |

[51] Int. Cl.$^6$ .................... C03C 8/02; C03C 8/14; C03C 8/20

[52] U.S. Cl. .................... 501/17; 501/14; 501/18; 501/21; 501/66; 501/67

[58] Field of Search .................... 501/14, 17, 18, 501/21, 65, 66, 67; 427/189, 193

[56] References Cited

U.S. PATENT DOCUMENTS

| 4,282,035 | 8/1981 | Nigrin | 501/32 |
| 4,285,731 | 8/1981 | Nigrin | 501/21 |
| 4,361,654 | 11/1982 | Ohmura et al. | 501/21 |
| 4,554,258 | 11/1985 | Francel | 501/21 |
| 4,562,161 | 12/1985 | Mennemann et al. | 501/59 |
| 4,565,791 | 1/1986 | Boudot et al. | 501/56 |
| 4,590,171 | 5/1986 | Nigrin | 501/25 |
| 4,870,034 | 9/1989 | Kiefer | 501/66 |
| 4,892,847 | 1/1990 | Reinberz | 501/14 |
| 5,264,398 | 11/1993 | Thometzek et al. | 501/21 |
| 5,281,563 | 1/1994 | Kommo et al. | 501/59 |
| 5,292,690 | 3/1994 | Kawachi et al. | 501/33 |
| 5,308,803 | 5/1994 | Clifford et al. | 501/17 |
| 5,326,728 | 7/1994 | Boury et al. | 501/67 |
| 5,348,915 | 9/1994 | Thometzek | 501/24 |

FOREIGN PATENT DOCUMENTS

| 0 267 154 | 5/1988 | European Pat. Off. . |
| 0 347 379 | 12/1989 | European Pat. Off. . |
| 0 452 065 | 10/1991 | European Pat. Off. . |
| 2406888 | 8/1974 | Germany | 501/65 |
| 0024599 | 11/1967 | Japan | 501/65 |
| 6155040 | 12/1981 | Japan | 501/66 |
| 0812576 | 4/1959 | United Kingdom | 501/65 |
| 2034300 | 6/1980 | United Kingdom | 501/67 |
| 2 092 568 | 8/1982 | United Kingdom . |
| 2 154 373 | 9/1985 | United Kingdom . |
| 2 158 062 | 11/1985 | United Kingdom . |
| 2 160 859 | 1/1986 | United Kingdom . |
| 90/15782 | 12/1990 | WIPO . |

OTHER PUBLICATIONS

*Dictionary of Ceramic Science & Engineering* Loran O'Bannon 1984 (No Month) pp. 54, 94, 117, 122 & 270.

*Primary Examiner*—Karl Group
*Attorney, Agent, or Firm*—Banner & Witcoff, Ltd.

[57] ABSTRACT

A composition which represents a new class of unleaded transparent vitreous ceramic which is described as an 'Advanced or Combined Intermediate-Oxide Alkali Borosilicate. The composition comprises in combination a specially developed alkali borosilicate and a major addition selected from combinations of the group of traditionally accepted opacifiers, consisting of Zirconium, Tin, and Titanium, the said elements being present in said combination in amounts 0.5 to 43.9 wt % in terms of the Oxide form. The major addition will consist of at least two of said elements. The composition may include minor additions ($\leq 10$ wt %) of any other element or elements which do not cause loss of transparency.

11 Claims, No Drawings

UNLEADED TRANSPARENT VITREOUS CERAMIC COMPOSITIONS

This application is a file wrapper continuation of application Ser. No. 08/357,529, filed on Dec. 16, 1994, abandoned, which is a file wrapper continuation of application Ser. No. 08/083,354, filed Jun. 28, 1993, abandoned.

This invention relates to unleaded ceramic compositions, and coatings and articles made therefrom, and more particularly to unleaded combined addition intermediate oxide, alkali-borosilicate based vitreous compositions which are usable to form transparent, durable, decorative/functional ceramics and ceramic materials for application as additives, fluxes, glazes, engobes/protective interfaces, glasses, glass fibres, technical glasses (incorporating sealant and joining categories), and dental porcelains.

Since the middle of the 18th century, the traditional ceramics industry has attempted to develop acceptable unleaded vitreous ceramic compositions, and whilst an improved unleaded glaze for application to porcelain was proposed in 1820, it was not until 1865 that the first glaze was proposed for use with earthenware (W P Rix, Leadless Glaze—J Soc Arts, Mar. 3 1899 pages 324 to 336). This was an alkali borosilicate composition, but despite persistent efforts to employ this glaze, it was abandoned—due to loss of gloss, poor flow characteristics, and colour deterioration of stains used for decoration—in favour of a Lead based glaze.

At the turn of the 19th Century, the use of red Lead in raw glazes was perceived as a health hazard to factory workers and consequently the much safer Lead Bisilicate was introduced as a raw material.

The present day emphasis however has changed. The health hazard now being perceived is in terms of Lead release levels from Lead-containing vitreous ceramic compositions, for example glazes, glasses, and stains, which affect the health of the general public which buys the products. Resistance to both acid and alkaline chemical attack is of paramount importance in present day society with the use of such ceramic containers to store acidic food and drink, and the subsequent use of dish-washing machines with alkaline detergents/acidic descalers to clean the ceramic articles.

Lead has long been recognised as a toxic substance, and adverse health effects such as damage to the liver, the kidneys, and the nervous, reproductive, cardiovascular, immune, and gastrointestinal systems may well result from exposure over months or years to Lead. Infants and children are the most sensitive to Lead exposure. Several recent studies have indicated that Lead causes behavioural and performance related deficiencies in children exposed to the substance at levels below those which produce physical effects. Other recent studies have shown that the fetus is sensitive to low levels of Lead in the mother's blood, resulting in impaired fetal development and low birth weight.

Such research has led to the Food and Drugs Administration (FDA) in the United States lowering the Lead release limits for ceramics which come into contact with food and drink, as Lead-based ceramics are recognised as a prime source of Lead that is ingested in the diet. The limits introduced in late 1991 represent the most stringent national legislation to date, these limits being:

| Category of Ware | Release Limit |
| --- | --- |
| Large Hollow-ware (>1.1 l) eg large bowls | 1.0 |
| Small Hollow-ware (<1.1 l) eg small bowls | 2.0 |
| Flatware eg plates, saucers | 3.0 |
| Cups/mugs and Pitchers | 0.5 |

The Lead leaching levels are determined by means of a 24-hour soak test in a 4% acetic acid solution and are quoted in terms of mg/l. Compliance with the stated levels is based upon the highest Lead leaching value for any one unit of a six-unit sample, except for flatware for which compliance is based upon the average value for a six-unit sample.

The State of California has proposed that Lead release levels for container type products be set even lower at 0.006 mg/l, and it is likely that UK and ISO standards will follow this general trend at their next revision.

The introduction of this legislation has driven some manufacturers in the glaze field into applying two-coat systems, especially to container-type products. Such two-coat systems involve the application of unleaded glazes to the interior and leaded glazes to the exterior, but this is still clearly unacceptable in mug/cup applications, where the lips come into direct contact with the exterior surface.

Historically, Tin Oxide has been used as an opacifier in glazes. Mainly due to cost increases during the 1914–1918 war, research was directed towards seeking a more cost-effective alternative. The use of Zirconia and later Zircon in the above role was initiated in the United States. It was not until the 1950's that ground Zircons were commercially produced in the United Kingdom for the first time: in the following years these largely replaced the more costly Tin Oxide as an opacifying agent.

The use of Titania as a powerful opacifying agent has been mainly limited to the low/fast firing systems, where maturation temperatures are relatively low e.g. <1000° C., compared to those of glazes used in the pottery field e.g. <1400° C. This is due to the nucleation, growth and subsequent phase transformatiom of the anatase crystalline form of Titania to rutile. At temperatues between 820° C. and 860° C., the larger rutile crystals tend to dominate thus causing a yellow/cream colouration. The use of Titania as an opacifier in low/fast firing systems again superceded the use of Tin Oxide following the 1950's, when high purity Titania became commercially available.

The precise mechanism by which opacification is obtained with these elements is often contradictory in the literature. It is often stated that raw compounds containing these elements, which are added at the mill, are virtually insoluble in the base formulation. Other sources refer to such compounds as having a limited solubility and whilst being soluble at fritting temperature, they recrystallise during cooling or subsequent maturation/cooling. In either event, small discrete second phase particles remain or are formed, which disperse light via reflection and refraction and consequently opacify the resultant ceramic material. There are many instances in the literature outlining compositional changes to base formulations required to optimise opacification using these elements.

Tin, Zirconium and Titanium—usually added in the form of an oxide or a silicate—are perceived by those skilled in the art of ceramics, which is taken to include glasses, when added as major additions, as opacifying agents.

It must be understood that the use of the term 'major' or likewise 'significant', applied to the weight proportion of an element or a compound of that element in a ceramic composition, is relative, the value being dependent upon the specific element in the specific environment. For example, it is known that in certain glaze compositions, 0.5 to 1.0 wt % of Tin Oxide is required to opacify the ultimate glaze, whilst in other glaze compositions this level might rise to 5.0 wt %. This range of Tin Oxide therefore, i.e. 0.5 to 5.0 wt %, in these specific glaze compositions, must be considered in terms of a major addition, with regard to the property of opacification, despite the extremely low level of addition.

It is well known that Zircon (Zr SiO$_4$) is more soluble than Tin Oxide in glazes, and it-has been stated that approximately 2 wt % of Zircon remains in solution, even in those compositions which have been optimised to promote opacification. As a consequence, generally speaking, more Zirconium than Tin is required to opacify a glaze. It should thus be understood that it is common knowledge that small percentages of these elements in suitable compound form are soluble in glaze compositions, and further that this is beneficial to the glaze. With regard to specificity of an element in a particular environment however, U.S. Pat. No. 4,870,034 states that no more than 0.5 wt % Zirconia should be added to borosilicate glass compositions as there is a tendency to crystallisation.

In order to reduce the extent of this solution in glaze applications, the above elements are frequently 'added at the mill' in a suitable compound form and of a defined particle size distribution, thus reducing solubility and enhancing opacity for a particular wt % addition of the elements.

It is common for silica based systems containing major additions of such elements as Bismuth, Barium, Strontium, Zinc, Lanthanum, Molybdenum, or Fluorine, to refer to small and/or optional additions of Zirconium, Tin, and Titanium in their compositions, but as mentioned above, solution of small amounts of these elements is common knowledge and is considered to be beneficial. Some compositions with low silica levels (i.e. <40 wt %) can contain relatively large amounts of Zirconia and/or Tin Oxide, but once again require major additions of rare earth oxides such as Lanthanum Oxide (G.B. Patent No 2 154 373) and thus fall outside the present invention.

Indeed, it has been emphasised in the recently published European Patent Application No 0 452 065 that significant amounts of the above-mentioned elements yield opaque or partially opacified glazes, which may be desirable in certain instances. This application is typical however when it quotes the range of addition of such optional compounds as being between 0 and 10 wt %. It is noticeable that in this patent application, whenever the above-mentioned elements are added to their Bismuth based frit composition—at the mill— the resultant glaze is a vellum, matt, opacified or discoloured yellow. The range of the addition causing these effects is stated as being between 0.99 to 5.0 wt %, and it is thus not at all surprising that this particular patent application does not refer to the glazes produced within the formulation limits as being transparent in contrast to the present invention.

Yet another disclosure—see U.S. Pat. No. 4,892,847 which specifies a Bismuth based frit for vitreous coating applications—incorporates additions of Zirconia and/or Titania within the range 0.3 to 8.0 wt %, but prefers such additions to be within the range 0.5 to 2.0 wt %. Once again, this United States patent does not disclose that the formed coatings are transparent, or indeed are intended to be so.

It should be noted that the present invention is not based upon, and does not include in its compositional variations, deliberate major additions of Bismuth (U.S. Pat. Nos. 4,554, 258 and 4,892,847, EPA Patent Nos 0 347 379 and 0 452 065, and GB Patent No 2 160 859A), Barium (U.S. Pat. Nos. 4,590,171 and 4,285,731), Strontium (U.S. Pat. Nos. 4,282, 035), Zinc (EPA Patent No 0 267 154 and WO Patent No 90/15782), Lanthanum (Interceram 41 (3) pp 173–175 1992 and GB Patent Nos 2 158 062A and 2 154 573), Molybdenum (GB Patent No 2 092 568A), or Fluorine (WO Patent No 90/15782), which are elements commonly cited as major additions in other unleaded glaze and glass systems. This does not however preclude such elements or other elements being added as minor additions to the present system, i.e. at levels $\leq$10 wt % provided that transparency is retained.

Examples are known of processed, transparent ceramic materials which contain additions of the elements Sn, Zr, and Ti individually, usually at a level of ~<5.0 wt %. One such example refers to a Quartz-Tin Oxide (0.23 to 2.0 wt %) short wavelength filter application. Another example may be found in the glaze field where Zirconium Oxide at a level of 5.1 wt % has been added to transparent glazes in which the major additive is Lanthanum Oxide (Interceram 41 (3) pp 173–175 1992).

It is thus apparent that there is an acute need for an 'all-round' vitreous ceramic composition which is usable to form transparent, durable decorative/functional ceramic articles and compositions which can be adapted to such applications as additives, fluxes, glazes, engobes/protective interfaces, glasses, glass fibres, technical glasses (incorporating sealant and joining categories), and dental porcelains. A commercially acceptable system will need to satisfy the following factors:

(i) Cost (ii) Availability (iii) Effect on processing parameters, and (iv) Effect on ultimate properties.

The present invention satisfies all of these factors.

The present invention describes a new category of unleaded transparent vitreous ceramic which may be described as an 'Advanced or Combined Intermediate Oxide Alkali Borosilicate Vitreous Ceramic'. There are other elements which may take the role of an Intermediate Oxide in a vitreous ceramic structure; however, with regard to health and safety, property optimisation, availablity and cost factors, Zirconium, Tin, and Titanium and preferably Aluminium represent the most desirable Intermediate Oxides, and thus form the basis of the present invention.

The term 'vitreous ceramic' in terms of the present invention is taken to mean a glassy inorganic material having no long range crystalline order, thus being considered to be amorphous. The present invention retains combined amounts of the aforementioned elements within the short range order or amorphous structure of the glass.

The term 'transparent' is taken to mean capable of transmitting useful light without diffusion except that due to refraction. This encompasses glass/glazes which are clear, and coloured/stained. With respect to the present system being used in the role of an additive or a flux, it is obvious that the end product/application may not appear to the observer as being transparent. However, it is contended that the present system does not contribute towards this effect.

For the purposes of the present invention the use of the word 'element' shall be taken to include the material in elemental form or in suitable compound form, the latter being an oxide forming compound, and the said word 'element' should be construed accordingly.

According to the present invention there is provided an unleaded transparent vitreous ceramic composition comprising in combination a specially developed alkali borosilicate and a major addition selected from combinations of the group of traditionally regarded opacifiers consisting of the elements Zirconium, Tin, and Titanium, said elements being present in said combination in amounts of 0.5 to 43.9 wt % in terms of the Oxide form.

Preferably, the alkali borosilicate will contain a small amount of Alumina 0.5 to 6.0 wt % and Calcia 0.5 to 6.0 wt % in terms of the oxide forms. Strontia and/or Baria may be partially or wholly substituted for the Calcia as the alkaline earth minor addition, although this is not preferred.

The composition will preferably incorporate at least two of said elements, in suitable compound form, from said group, said compound forms preferably being incorporated into said composition by melting or fritting in order that their solution is optimised, and in order that upon cooling, subsequent processing and usage, devitrification or recrystallisation does not occur. This does not however preclude the introduction of said elements via other processing methods such as, for example, mill additions.

The process for the production of the transparent vitreous ceramics or ceramic materials is characterised in that the process includes mixing together the oxide forming materials of the alkali borosilicate composition with at least two elements selected from the group consisting of Zirconium, Tin, and Titanium and melting/fritting said mixture so as to optimise the solubility of said elements.

This action results in the beneficial properties conferred by these elements on the ultimate processed transparent vitreous ceramic material being optimised.

The specially developed low Alumina alkali borosilicate will preferably be composed of Silica, Boric Oxide, Aluminium Oxide, Calcium Oxide, Sodium Oxide and/or Potassium Oxide, and Lithium Oxide introduced into the formulation via any element or suitable compound form.

The aforementioned elements may be introduced into the formulation via any element or suitable compound form. In the main, oxides and silicates are used due to their availability, cost effectiveness, and known purity. This does not, however, preclude the addition of the aforementioned compounds in other forms. Those compound forms most frequently used in the traditional ceramics industry include, for example, mineral compounds, oxides, hydroxides, silicates, carbonates, sulphates and nitrates.

'Suitable compound form' should thus be taken to mean any oxide forming material. Elemental forms are not usually used due to the hazardous nature of elements in powder form; this does not however preclude their use in such form.

For the purposes of classification, in the majority of silica based glasses, they have been traditionally arranged into four categories (Schott, Technical Glasses: Physical and Chemical Properties, 1990).

(i) Soda Lime glasses;
(ii) Lead glasses;
(iii) Alkaline earth aluminosilicate glasses;
(iv) Borosilicate glasses
  (a) Non alkaline earth borosilicate glasses;
  (b) Alkaline earth containing borosilicate glasses;
  (c) High borate borosilicate glasses.

According to Schott, who is world renowned as an expert in the vitreous ceramics field, it is stated that for category (iv)(c) it is commonly accepted that such glasses containing >15 wt % $B_2O_3$ have low chemical resistance, in contrast to the prseent invention. Schott also refers to the use of small amounts of $ZrO_2$ and $TiO_2$ in glass ceramics which act as nucleating agents to produce crystalline inclusions in contrast to the present invention. Schott claims that such glass ceramics represent a 'new material'.

Similarly, the present invention is claimed to represent a new material as it has not hitherto been appreciated to formulate a transparent, durable, alkali borosilicate based, vitreous ceramic composition which is based on the incorporation of a major combined addition of the aforementioned elements in either elemental form or in suitable compound form, and which remains vitreous and transparent during melting, subsequent processing and usage in the end application.

The desired properties may thus be 'designed in' dependent upon application requirements, by varying the proportions of the aforementioned elements which comprise the major addition. For example, Tin promotes fluidity or fluxing of stains, glazes and glasses at relatively low temperatures, and also improves the resistance to acids,. Additions of Zirconium promote gloss and durability, both with regard to alkali chemical and abrasion resistance, whilst Titanium, in addition to promoting gloss and fluidity, also improves acid resistance. All three act to promote colour protection/stabilisation.

Although the majority of listed property benefits are generally known, as described above, it is contended that the conferred property of colour protection/stabilisation in flux and glaze applications, which incorporate major, combined additions of the aforementioned elements in soluble form, is novel.

In the present invention, it is preferred that such a combined major addition of the aforementioned elements (in terms of the Oxide form) should be >5 wt %, but this should not be taken to limit the Invention. It has already been explained that, in terms of actual wt %, small additions of these elements may have a beneficial effect.

Thus it is contended that combined additions of these elements, to low Alumina alkali borosilicate matrices as described in the present invention, within the range 0.5 to 5.0 wt %, fall within the terms of the invention, as this can also represent a major/significant addition having regard to the optimisation of the properties referred to above.

For example, a glaze application for bone china has been formulated in which $ZrO_2$ (5 wt %) has been added in order to improve alkali/abrasion resistance, and in which $SnO_2$ (2 wt %) has been added to exploit its fluxing power, thus ensuring good flow properties and maintaining the maturation temperature at the level currently used for leaded glaze systems, i.e. 1060 to 1080° C. Small additions of Titania (0.5 to 1.0 wt %) have also been found to aid gloss, fluidity, and to improve acid resistance. The glaze has been tested with a full range of commercially available unleaded on-glaze colours and has been found to afford excellent protection/ stabilisation, thus ensuring optimisation of colour quality. For this specific bone china transparent glaze application, the level of Silica in the specially developed alkali borosilicate is maintained at a level of 50 to 60 wt %. The levels of Boric Oxide and Aluminium Oxide are fixed at between 18 to 22 wt % and 2.5 to 4.0 wt % respectively, and the levels of Calcia, Sodium Oxide and/or Potassium Oxide, and Lithia are set at 0.5 to 4.0 wt %, 10 to 14 wt %, and 0.5 to 1.0 wt % respectively.

For this particular bone china glaze application, 7 to 10 wt % china clay is added at the mill in order to form a suitable 'slip' or 'slurry' which may be sprayed or otherwise applied onto the bone china body. This introduces between 2.5 to 4.0 wt % Aluminium Oxide into the formulation. Thus, this example of a glaze for bone china can be written as shown in Table I below.

TABLE I

| COMPOSITION | WT % |
|---|---|
| Specially developed low Alumina Alkali Borosilicate | $S_iO_2$ . . . 50 to 60<br>$B_2O_3$ . . . 18 to 22 |

TABLE I-continued

| COMPOSITION | WT % |
|---|---|
| | $Al_2O_3$ . . . 2.5 to 4.0 |
| | CaO . . . 0.5 to 4.0 |
| | $Na_2O$ . . . 10 to 14 |
| | $K_2O$ . . . 10 to 14 |
| | $Li_2O$ . . . 0.5 to 1.0 |
| Major Combined Intermediate | $ZrO_2$ . . . 5.0 |
| Oxide Addition | $SnO_2$ . . . 2.0 |
| | $TiO_2$ . . . 0.5 to 1.0 |

Addition of the minima for the major Intermediate Oxide addition yields an addition of 7.5 wt % that the combined major addition of Zirconium, Tin, and Titanium (in terms of the oxide form) can form in this example of a bone china glaze application.

This example of a bone china glaze formulation based on the prseent invention has passed a 64-hour Calgonite test without any loss of gloss The Calgonite test is a well known standard in the Tableware Industry which represents an accelerated testing procedure to indicate the resistance of a ceramic material to the chemical environments found in dish-washing machines. If the gloss of a ceramic material, for example glaze, glass, or colour is unaffected after a 64-hour soak in a 0.5% solution of calgonite at 77° C. (i.e. 4×16-hour cycles), the material is regarded as being satisfactory. This period of 64 hours is reckoned to be equivalent to ~1000 dish-washer cycles.

It is known however that certain alkali borosilicate compositions, currently being marketed as unleaded glazes for application to bone china and other bodies, tend to lose their gloss after only 32 hours of the test.

For other glaze applications, it is envisaged that the amount of china clay added will range between 0 to 15 wt % depending upon specific glaze composition. Further, it is thought that small additions of Bentonite may be used in the same role, either in conjunction with or independently of the china clay. Such additions will represent a level of Alumina set between 0.5 to 6.0 wt %. Further sole or combined use of specific glaze additives such as flocculants, de-flocculants, binders, suspension agents, biocides, or other additives, are also possible in addition to, or as an alternative to, the above.

Small amounts of $Al_2O_3$ (0.5 to 6.0 wt %) are beneficial to the maintenance of gloss of the transparent glazes and glasses based upon the present invention. Alumina additions are frequently recommended in the literature in order to promote opacification, and certainly with additions of Alumina >6.0 wt %, this is true. Many current unleaded ceramic compositions contain relatively large (i.e. >6.0 wt %) additions of Alumina.

It will be appreciated then that any alkali borosilicate based composition which contains low amounts (i.e. <6.0 wt %) of Alumina, no other listed major addition as has been previously referred to, i.e., Bismuth Oxide, Barium Oxide, Zinc Oxide, Lanthanum Oxide etc., in conjunction with a combined major addition >(0.5 to 5.0) wt % of the aforementioned elements, and any other elements added as minor additions ($\leq$10 wt %) which do not cause loss of transparency will fall within the scope of the present invention. Such a ceramic composition would thus be described as a low Alumina, alkali borosilicate which contains major combined additions of the aforementioned elements in soluble form, which confer the main and previously described benefits to the final silica based composition. The invention would read onto the above composition because combined additions of the aforementioned elements could no longer realistically be described as an optional/minor addition relative to the other elements (e.g. Bismuth, Barium, Zinc, Strontium, and Lanthanum) of the composition, for which certain property benefits are overriding.

More generally, it is an attribute of the present invention that the specially developed low Alumina alkali borosilicate will contain 40 to 69 wt % Silica and is thus described as being silicatic, silicate, or silica based. This distinguishes the present invention from soda-alumina borosilicate glasses which contain 70 to 74 wt % $SiO_2$ and none of the aforementioned elements (GB Patent No 2 136 413A) and from specialised optical glasses which are non-silicate based (U.S. Re-Issue Pat. No 21 175), and also from low Silica (<40 wt %), high Alumina (~20 wt %), glazes as described in G B Patent No 2 154 573. This patent also specifies glazes which do not contain Alumina but must contain major additions of rare earth metals such as Lanthanum Oxide.

Further, the level of Boric Oxide is set between 10 to 30 wt %, whilst that of Alumina is set between 0.5 to 6.0 wt %.

The pinking of glazes containing Tin Oxide is commonly referred to in the literature as 'Chrome-flashing'. It has also been recognised however that Sn in association with relatively high levels of Calcia also leads to the same problem. It is a characteristic of the present invention that the Calcia is maintained at a level between 0.5 to 6.0 wt %, whilst the level of Sodium Oxide and/or Potassium Oxide is set between 5 to 25 wt % and that of Lithium Oxide at 0.1 to 2.0 wt %.

This more general formulation of specially developed low Alumina, alkali borosilicate applicable to the full range of application areas specified may be represented as shown in Table II below.

TABLE II

| COMPOSITION | WT % |
|---|---|
| Specially developed low Alumina alkali borosilicate | $SiO_2$ . . . 40 to 69 |
| | $B_2O_3$ . . . 10 to 30 |
| | $Al_2O_3$ . . . 0.5 to 6.0 |
| | CaO . . . 0.5 to 6.0 |
| | $Na_2O$ . . . 5 to 25 |
| | $K_2O$ . . . 5 to 25 |
| | $Li_2O$ . . . 0.1 to 2.0 |
| Major Addition. Combination of at least two from:- | $ZrO_{2)}$ <43.9 wt % |
| | $SnO_{2)}$ <43.9 wt % |
| | $TiO_{2)}$ <43.9 wt % |

Addition of the minima yields a maximum of 43.9 wt % that the combined major addition of Zr, Sn, and Ti (in terms of the oxide form) can form in the combined formulation. It is however a preferred embodiment of the invention that the maximum wt % of the major addition is 25.0. It can thus be summarised that combined major additions of at least two of the elements Zr, Sn, and Ti within the range 0.5 to 43.9 wt % (for elements in oxide form) are covered by the invention. However, the preferred range of addition in wt % is 0.5 to 25.0 and the most preferred range is 5.0 to 18.5.

The specially developed low Alumina, alkali borosilicate promotes the solubility of major amounts of the aforementioned elements during the preferred route of glass melt formation, or fritting for glaze, engobe, technical glass, and dental porcelain applications. It is apparent that the level of Boric Oxide addition at its maximum value shown in Table II (30 wt %) is relatively high. At these higher levels of addition, it would be assumed by a person skilled in the art of ceramics that chemical, abrasion, and crazing resistance and colour stabilisation properties would deteriorate to such an extent that the composition would be of no commercial value.

This is widely referred to as the Boric Oxide 'anomaly' whereby the state of molecular co-ordination changes from that of $BO_4$ tetrahedra to that of $BO_3$ triangles, with subsequent deterioration in properties mentioned. It is however known from research on glaze and glass systems, that the maxima of Boric Oxide addition, above which this deterioration in properties occurs, is variable and is dependent upon the specific composition. This maxima is widely quoted as being within the range 10.0 to 15.0 wt %. It has been suggested that this maxima is raised in compositions which are alkali rich.

More specifically, when Sodium Oxide and/or Potassium Oxide is added to a glaze/glass composition, this introduces the extra Oxygen necessary to maintain $BO_4$ tetrahedral co-ordination. The effect of adding Soda and/or Potassium to a Boric Oxide glaze/glass is just the opposite to the effect of adding Soda and/or Potassium to a Silica based glaze/glass. When Soda and/or Potassium is added to Silica, the co-ordination of Silica remains 4, the extra Oxygen producing single-bonded Oxygens in the Silicon-Oxygen network, which break up the network, resulting in a weaker or softer glaze/glass. On the other hand, when Soda and/or Potassium is added to a Boric Oxide glaze/glass, over certain (undefined) range of composition, the extra Oxygen is taken up by the increase in co-ordination number of the Boron, subsequently strengthening or hardening the glaze/glass.

It is a proposal of the present invention that the Boric Oxide maxima is raised so as to counteract the effect of deterioration in properties normally experienced with such raised additions of either compound individually.

Further, the present invention incorporates major combined additions selected from the aforementioned elements in soluble form, of which in particular Zr and Ti confer extremely stable hydrated surfaces, Although the hydration of $ZrO_2$ is energetically very favourable, the prominence of ionic species like $ZrO^{2+}$, $Zr^{4+}$, and $HZrO_3^-$ will only occur below pH~0 and above pH~17 respectively. Thus a hydrated $ZrO_2$ surface is stable at all pH values of solution that are likely to be experienced during normal usage, and further, it is thought to offer a very high activation barrier for diffusion of other ionic species through it. The present invention aims to optimise the properties required for specific applications via the appropriate choice of a combined major addition selected from the aforementioned elemental group.

It is submitted that the incorporation of Tin Oxide, in soluble form, into the glaze/glass structure in accordance with the present invention results in an equilibrium being established between Sn II and Sn IV oxidation states. It is known that the nature of this equilibrium is dependent upon the specific glaze/glass composition into which the Tin is incorporated. It is accepted by those skilled in the art of ceramics that the Sn IV state represents a network modifying ion, having a Field Strength of 7.9—see Table III below (Ceramics Glaze Technology, J R Taylor and C A Bull, page 7, Pergammon Press 1986).

TABLE III

IONIC FIELD STRENGTHS OF CATIONS PRESENT IN GLAZES OR FRITS

| Ion | Ionic Radius (Å) | Field Strength $Z/r^{2*}$ | Structural role in glaze or frit |
|---|---|---|---|
| $B^{3+}$ | 0.23 | 56.7 | Network-forming ions |
| $P^{5+}$ | 0.35 | 40.8 | |
| $Si^{4+}$ | 0.42 | 21.6 | |
| $Ge^{4+}$ | 0.53 | 14.2 | |

TABLE III-continued

IONIC FIELD STRENGTHS OF CATIONS PRESENT IN GLAZES OR FRITS

| Ion | Ionic Radius (Å) | Field Strength $Z/r^{2*}$ | Structural role in glaze or frit |
|---|---|---|---|
| $Al^{3+}$ | 0.51 | 11.5 | Intermediate ions |
| $Ti^{4+}$ | 0.68 | 8.7 | |
| $Zr^{4+}$ | 0.79 | 6.4 | |
| $Sn^{4+}$ | 0.71 | 7.9 | Network-modifying ions |
| $Mg^{2+}$ | 0.66 | 4.6 | |
| $Zn^{2+}$ | 0.74 | 3.6 | |
| $Li^+$ | 0.68 | 2.2 | |
| $Ca^{2+}$ | 0.99 | 2.1 | |
| $Sr^{2+}$ | 1.12 | 1.6 | |
| $Pb^{2+}$ | 1.20 | 1.4 | |
| $Na^+$ | 0.97 | 1.1 | |
| $Ba^{2+}$ | 1.34 | 1.1 | |
| $K^+$ | 1.33 | 0.6 | |

*Z = valency   r = ionic radius

This belief is disagreed with and it is suggested that it is more likely that the Sn IV state plays the role of an intermediate ion as do Zr IV and Ti IV states. It is further suggested that it is in fact the Sn II state that plays the role of Network modifying ion, having a Field Strength of 2.3. Sterically, the Sn IV ion is smaller (0.71 Å) in size (ionic radius), than the Zr IV ion (0.79 Å), yet larger than both Ti IV and Al III ions. Thus there is no reason to suppose that this suggestion is untrue. Further, it is suggested that it is the Sn II state in its role of Network Modifier that promotes the enhanced fluxing capacity found in glazes/glasses based on the present invention.

The present invention specifically relates to the combined major additions of such elements to a specially developed low Alumina alkali borosilicate matrix so as to 'design in' and balance out desired property benefits, whilst still retaining transparency, gloss and associated higher refractive index ( >1.5). This clearly distinguishes the present invention from traditional alkali borosilicate formulations, which are being proposed as unleaded glazes suitable for application to pottery. Such systems are less glossy and have lower refractive indices of ≦~1.5. Such alkali borosilicate compositions also suffer from the drawback that their maturation temperature is ~160° C. higher than the old Lead-based systems which were in the order of 1060 to 1080° C. As a consequence of this, it is necessary to raise the firing temperature and/or significantly improve the processing equipment for the application of these materials, such that an acceptable surface finish is achieved. The present invention allows the formulation of glaze compositions which mature at the same temperature range as the old Lead-based systems (1060 to 1080° C.), thus yielding an acceptable surface finish without the need to change either firing or processing conditions.

The present invention uses the aforementioned elements in the manufacture of combined addition intermediate oxide, alkali borosilicate based transparent, durable, decorative/functional vitreous ceramics and ceramic materials. These said transparent vitreous ceramics and ceramic materials are of uniform refractive index (>1.5), such that much of the light at the air/ceramic interface is transmitted through the ceramic. In the case of a glaze, engobe/protective interface, this light is then reflected/scattered from, or partially absorbed by, the substrate.

In the case of a transparent flux, this is used in conjunction with a more refractory coloured stain to form a 'colour'. These colours are used to decorate glasses and glazed ceramic articles, the colour being categorised as under, within, sink-in, majolica, or on-glass/glaze decoration. The flux, which usually represents only 15% to 50% of the composition, acts primarily to fluidise the stain at a relatively low temperature, i.e. below or at the glaze maturation temperature, so as to ensure a good bond to the substrate and/or glaze, and an aesthetic finish.

Transparent fluxes are also used in conjunction with ceramic stains to form printing inks. Such inks may be transferred to a ceramic body by lithographic techniques, including transfers and screen or pad printing. Inks similar to colours may be applied as under, within, sink-in, majolica, or on-glaze decoration, as above.

With reference to all types of inks and colours, it is important that the flux acts to protect and stabilise the original stain colour during maturation, subsequent cooling and usage. When in service, the flux must promote durability and have good resistance to both acid and alkaline environments in order that colour is maintained and that leaching of stain elements is prevented. This is especially relevant in the case of an on-glaze colour which is bonded on to the surface of the glaze and interfaces with the surrounding environment. In such a case, not only is chemical resistance required, but also abrasion resistance.

It is interesting to note that the majority of stains used in the higher quality end of the traditional ceramics field contain the elements specified in the present invention, i.e. Zirconium, Tin, and Titanium, for the production of blue/dark, pink/red, and yellow/brown colours respectively. By incorporating major combined additions of these elements into the fluxes ensures that the stain colours are protected/stabilised, due to the fact that full or partial equilibrium conditions are established relatively quickly between the stain and the flux during maturation. It is well known that fluxes which are not correctly formulated react with the stains over the duration of the maturation period, and as a consequence the colour deteriorates.

The same principle applies to glazes themselves which can adversely affect colours during maturation. Glazes which are formulated in accordance with the present invention protect/stabilise colours by means of the establishment of full or partial equilibrium conditions at the glaze/colour interface. The present invention allows Lead-based glazes to be replaced with totally health compatible unleaded systems.

Variant vitreous ceramic coatings such as glaze and engobe/protective interface formulations based upon the present invention will be applicable to porcelains, earthenware and other body substrate compositions. The present invention will also be particularly effective in the production of aesthetically acceptable 'once-fire' glazes and transparent glazes that are applied according to the 'Majolica or Fayence' technique. Compositions made according to the present invention may also be used as additives to any other glaze/glass compositions or indeed to body compositions to enhance their properties.

In the case of glass crystal which is produced in monolithic form, the present invention allows the replacement of Lead and Barium based systems with a totally health compatible unleaded system, whilst still retaining a high refractive index. The melting point of the glass will be lower, thus conserving energy and costs. Facets may still be cut into the glass to enhance aesthetics by further refracting white light into its component colours.

In the case of glass fibres which are produced in monolithic form and used for cement reinforcement, which are currently processed and drawn at a temperature of 1520° C., the present invention will be used to conserve energy and costs by enabling fibre production at lower temperatures. This application will exploit the fluxing and alkali resistant properties of the elements.

In the case of technical glasses, sealants and joining compositions based on the present invention, which may be used in powder or monolithic form, the enhanced fluxing and chemical/abrasion resistant properties conferred by the aforementioned elements will be exploited.

In the case of dental porcelains, which are applied in powder form, relatively high thermal expansion, trans-transparent glasses can be manufactured which will be suitable for use in certain 'metallo-ceramic' systems. Alternatively, the glasses will be used in their own right, or as aesthetic additions to aluminous porcelain or technical ceramic base layers.

We claim:

1. An unleaded durable transparent vitreous ceramic composition consisting essentially of a combination of
   (a) an alkali borosilicate consisting of
       40 to 69 wt % silica;
       10 to 30 wt % boric oxide;
       5 to 25 wt % sodium oxide, potassium oxide, or mixtures thereof;
       0.1 to 2.0 wt % lithium oxide;
       0.5 to 6.0 wt % aluminum oxide; and
       0.5 to 6.0 wt % calcium oxide, strontium oxide or barium oxide;
   (b) a combination of at least two elements selected from the group consisting of zirconium, tin, and titanium, said elements being present in said combination in an amount ranging from 0.5 to 43.9 wt % in terms of the oxide form of said elements; and optionally
   (c) $\leq$10 wt %, in terms of the oxide form, of an element selected from bismuth, barium, strontium, zinc, lanthanum, and molybdenum.

2. The composition according to claim 1, wherein (b) said combination of at least two elements is present in an amount of 0.5 to 25 wt %.

3. The composition according to claim 1, wherein (b) said combination of at least two elements is present in an amount of 5.0 to 18.5 wt %.

4. The composition according to claim 1, wherein said composition consists of
   50 to 60 wt % silica;
   18 to 22 wt % boric oxide;
   10 to 14 wt % sodium oxide or potassium oxide;
   0.5 to 1.0 wt % lithium oxide;
   2.5 to 4.0 wt % aluminum oxide; and
   0.5 to 4.0 wt % calcium oxide; and
   a combination of at least two elements selected from the group consisting of zirconium, tin, and titanium, said elements being present in said combination in an amount ranging from 0.5 to 21.5 wt % in terms of the oxide form.

5. The composition according to claim 4, wherein said combination of at least two elements is present in an amount of about 5.0 to 18.5 wt %.

6. The composition according to claim 1, wherein said elements are present in said composition at a minimum of 7.5 wt % in terms of the oxide form of said elements.

7. The composition according to claim 1 wherein said elements are introduced as oxide forming material selected from the group consisting of hydroxides, silicates, carbonates, sulphates and nitrates of said elements.

8. A process for the production of an unleaded durable transparent vitreous ceramic composition, said process comprising the steps of:

mixing a low alumina alkali borosilicate consisting of
- 40 to 69 wt % silica;
- 10 to 30 wt % boric oxide;
- 5 to 25 wt % sodium oxide, potassium oxide, or mixtures thereof;
- 0.1 to 2.0 wt % lithium oxide;
- 0.5 to 6.0 wt % aluminum oxide; and
- 0.5 to 6.0 wt % calcium oxide;
- with at least two elements selected from the group consisting of zirconium, tin, and titanium, said elements being present in said mixture in an amount ranging from 0.5 to 43.9 wt % in terms of the oxide form of said elements, the remainder consisting essentially of said low alumina alkali borosilicate;

melting said mixture so as to optimize the solubility of said elements; and quenching said melted mixture so as to produce an unleaded durable transparent vitreous ceramic mass.

9. The process according to claim 8, further comprising the steps of:

pulverizing said unleaded durable transparent vitreous ceramic mass into a powdered form; and applying said powder to an article so as to coat said article with an unleaded durable transparent vitreous ceramic coating.

10. The process according to claim 8, further comprising the steps of:

pulverizing said unleaded durable transparent vitreous ceramic mass into a powdered form; and remelting said powder so as to form a glass.

11. The process according to claim 8, further comprising the steps of:

pulverizing said unleaded durable transparent vitreous ceramic mass into a powdered form; and combining said powder with other compounds.

* * * * *